United States Patent [19]
Kitazumi et al.

[11] Patent Number: 5,545,097
[45] Date of Patent: Aug. 13, 1996

[54] POWER TRANSMISSION BELT WITH FACING FABRIC AND METHOD OF FORMING THE BELT

[75] Inventors: Masato Kitazumi, Izumiootsu; Motonobu Yasufuku, Kobe, both of Japan

[73] Assignee: Mitsuboshi Belting Ltd., Kobe, Japan

[21] Appl. No.: 342,224

[22] Filed: Nov. 18, 1994

[30] Foreign Application Priority Data

Nov. 19, 1993 [JP] Japan .................................. 5-314082

[51] Int. Cl.$^6$ ....................................................... F16G 1/00
[52] U.S. Cl. .................................................... 474/266
[58] Field of Search ........................ 474/266–268, 474/271, 264, 260–262, 205, 249–251

[56] References Cited

U.S. PATENT DOCUMENTS 4,498,891  2/1985  Mashimo et al. .................. 474/268 X

*Primary Examiner*—Michael Powell Buiz
*Attorney, Agent, or Firm*—Wood, Phillips, VanSanten, Clark & Mortimer

[57] ABSTRACT

A power transmission belt includes a rubber belt body having a surface covered with a facing fabric. The facing fabric is treated with a resorcinol-formalin-latex (RFL) solution to adhere an amount of solid RFL effective to inhibit exposure of the rubber to a cooperating pulley of the covered surface. When the belt is a shaped belt the amount of solid RFL adheres to the facing fabric effective to allow the precise shape formation. The invention further contemplates a method of forming a belt including the steps of treating a facing fabric and adhering the facing fabric to a surface of the belt.

12 Claims, 1 Drawing Sheet

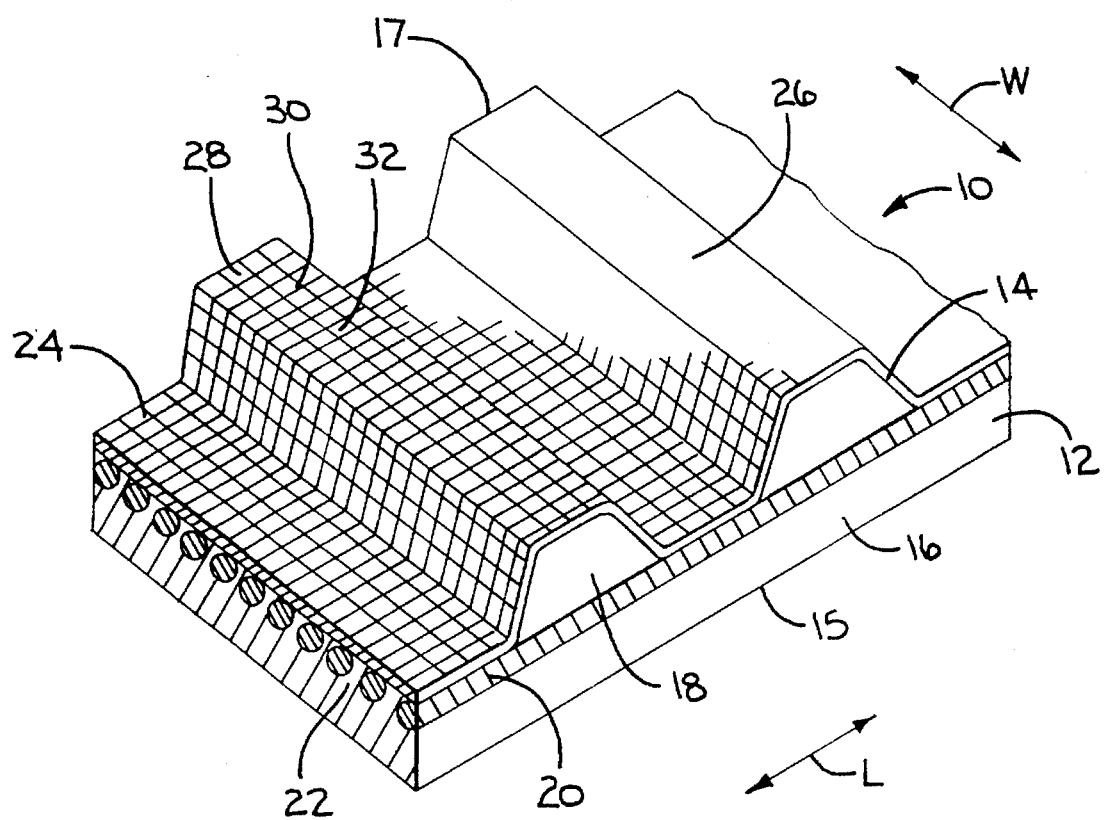

POWER TRANSMISSION BELT WITH FACING FABRIC AND METHOD OF FORMING THE BELT

TECHNICAL FIELD

This invention generally relates to a rubber power transmission belt having a facing fabric, More particularly, the invention relates to a belt having a facing fabric on the belt to define a pulley contact surface that inhibits exposure of the underlying rubber surface to a cooperating pulley. When the belt is a toothed belt, the facing fabric also permits the desired shape to be accurately formed. The invention also relates to a method of forming a belt that affords the above advantages.

BACKGROUND OF THE INVENTION

Belts made of rubber find many uses in transferring power from a drive pulley to a driven pulley. Different types of belts include toothed belts, V-belts, V-ribbed belts, cogged belts and the like. Toothed belts have longitudinally spaced teeth that account for high efficiency power transfer because they mate with longitudinal grooves in the pulleys to eliminate slippage.

The belts often include a belt body having at least one surface covered with a facing fabric to form a surface that contacts the pulleys. For a toothed belt, the covered surface is a surface on the teeth.

The facing fabric typically includes a fabric of crimped yarn of 6-nylon or 6,6-nylon as the weft in the longitudinal direction of the belt and non-crimped yarn of 6-nylon or 6,6-nylon as the warp in the lateral direction of the belt. The facing fabric is coated with a resorcinol-formalin-latex (RFL) rubber solution. The RFL solution ensures a firm adhesion of the facing fabric to the belt surface.

Rubber at the contact surface of the belt body is removed in powder form due to abrasion caused by the pulleys. The rubber powder tends to adhere firmly to the pulleys to partially fill in the pulley grooves and induce slippage, which adversely affects performance. This problem is particularly troublesome in a driving section of a printer which uses a toothed belt and can result in poor printing performance.

Examined Japanese Utility Model Publication No. 33800/1993 discloses an example of a toothed belt having a facing fabric that is treated only by the RFL solution and not covered with rubber at least on the surface contacting the pulleys. This belt experiences enlarged openings in the facing fabric caused by abrasion. The rubber surface of the teeth is sometimes exposed through these enlarged openings. Some of the exposed rubber becomes a rubber powder due to abrasion and attaches to the pulley grooves to degrade performance, for example, the printing performance in a printer.

A power transmission belt having a facing fabric that does not deteriorate in use is highly desirable.

SUMMARY OF THE INVENTION

This invention relates to a power transmission belt including a rubber belt body having at least one surface that is covered with a facing fabric to form a surface that contacts a pulley. The facing fabric is treated only with a resorcinol-formalin-latex (RFL) solution to attach thereto an amount of solid RFL effective to inhibit exposure of the rubber of the covered surface to a cooperating pulley in use. When the belt is a toothed belt, the underlying rubber surface has a shape and the amount of attached solid RFL is also effective to permit a desired shape, e.g., tooth shape, of the belt body to be precisely formed.

The invention also relates to a method of defining a belt with a facing fabric that inhibits exposure of the rubber to a cooperating pulley in use. The method includes the steps of treating the facing fabric and adhering the facing fabric to the a surface of the belt to define a pulley contacting surface.

The facing fabric of the present invention inhibits exposure of the rubber of the covered surface which thus inhibits emission of rubber powder that can adhere to the pulley to adversely affect performance. When the belt is has a shape, e.g., a toothed belt, the facing fabric has an amount of solid RFL that also permits precise shaping.

Numerous other advantages and features of the present invention will become readily apparent from the following detailed description of the preferred embodiments and the appended claims.

BRIEF DESCRIPTION OF THE DRAWINGS

The FIGURE is a perspective view of a section of a toothed belt of the present invention.

DETAILED DESCRIPTION OF THE PREFERRED EMBODIMENT

The present invention is applicable to toothed belts, V-belts, V-ribbed belts, cogged belts and other belts that have a facing fabric over a rubber surface to define a pulley contacting surface. A toothed belt will be used herein to describe the invention, it being understood that the invention is not limited to tooted belts and that the facing fabric permits precise shaping for belts other than toothed belts.

As shown in the FIGURE, a toothed belt 10 made in accordance with the present invention has a belt body 12 with an inner surface 14 and an oppositely facing outer surface 15 with laterally facing side surfaces 16, 17 extending therebetween. The inner surface 14 includes a plurality of teeth 18 that are equidistantly spaced in a longitudinal direction. The belt 10 also includes a plurality of longitudinally extending load carrying cords 20 embedded in a backing layer 22. The cords 20 define the belt neutral axis.

A facing fabric 24 is attached to and covers the inside surface of the teeth 18 to form a surface 26 that contacts, and cooperates with, a pulley (not shown). Warp yarns 28, extending in a widthwise direction (W) and weft yarns 30, extending in a lengthwise direction (L) define the facing fabric 24 and are made of filament or spun yarn using the materials described below. The woven warp and weft yarns 28,30 cooperatively bound openings 32 in the facing fabric 24. The present invention is directed to the facing fabric 24.

The facing fabric 24 is a conventional cloth or canvas. The preferred facing fabric 24 is a canvas. Representative materials from which the cloth or canvas can be made include 6-nylon, 6,6-nylon, polyester, aramid fibers, elastic fibers, and the like, and combinations thereof. A conventional urethane elastic fiber is preferably included in the weft 30. The weave pattern of the fabric can be plain weave, twill weave, satin weave, or the like.

The facing fabric 24 is only treated with a resorcinol-formalin-latex (RFL) solution. The facing fabric 24 has an amount of attached solid RFL that is effective to inhibit exposure in use of the rubber surface that the facing fabric 24 covers. When the belt has a shaped surface to which the facing fabric 24 is adhered, the amount of RFL is also effective to permit attainment of the precise shape, e.g., tooth shape.

The facing fabric 24 can be adhered to both the inner surface 14 and the side surfaces 16, 17 of the belt body 12. This arrangement is particularly useful for a V-belt.

The RFL solution is prepared by mixing an initial polycondensed product of resorcinol and formalin with a latex. The latex can be a tertiary copolymer of styrene-butadiene-vinylpyridine, hydrogenated nitrile rubber, chlorosulfonated polyethylene, epichlorohydrine and the like.

The molar ratio of resorcinol to formalin is in the range of about 2:1 to about 1:3. The preferred RFL solution contains a weight ratio of the initial polycondensed product of resorcinol and formalin to latex of about 1:1 to about 1:10.

The RFL solution also contains water.

The facing fabric 24 is prepared by immersing the facing fabric 24 in water while vibrating to cause shrinkage to about half the facing fabric's original width. The facing fabric 24 is then immersed into the RFL solution, squeezed through a pair of rollers at a squeezing pressure in the range of about 0.1 to about 1 kilograms force/centimeters (kgf/cm) gauge and dried. If necessary, the once treated facing fabric 24 is then treated again with the RFL solution as described above to achieve the desired amount of attached solid RFL.

The facing fabric 24 has at least about 30 wt % of the solid RFL attached thereto. For a toothed belt which has a shaped surface, the amount of attached solid RFL is in the range of about 30 to about 50 wt %. When the solid RFL is present in an amount less than about 30 wt %, the contact points of the warp 28 and weft 30 of the facing fabric 24 become loose, which enlarges the bounded openings 32. The enlarged openings may result in exposure of the rubber of the belt body 12 to a cooperating pulley. The exposed rubber can be abraded to produce rubber powder that adheres to the grooves of the pulley to adversely affect performance. When the solid RFL exceeds 50 wt %, the shape of, e.g., the teeth, cannot be precisely formed.

The teeth 18 and the backing 22 are made of a conventional rubber that exhibits good heat and aging resistance, such as hydrogenated nitrile butadiene (HNBR) rubber, chloroprene rubber, chlorosulfonated polyethylene (CSM) and alkylated chlorosulfonated polyethylene (ASCM). Alternatively, the rubber can be a natural rubber, a styrene-butadiene rubber, or a nitrile rubber. The selected rubber can contain conventional additives such as carbon black, zinc white, stearic acid, plasticizer and anti-aging agents. Curing agents such as sulfur and organic peroxide can also be present.

The cords 20 are made of glass or organic fibers. The glass cords 20 are made of twisted filaments of E-glass or high strength glass having a thickness of about 5 and about 10 micrometers (μm). The glass filaments are treated by a protective agent made from a rubber compound or RFL solution that acts as an adhesive. Alternatively, the organic fiber cords 20 are made of organic fibers such as twisted filaments of para-aramid (e.g., these sold commercially under the marks Kevlar™ and Technora™) that exhibit low elongation and high strength against stress. The organic fibers can have about 0.5 to about 2.5 denier. The organic filaments are conventionally treated with an RFL solution, epoxy solution, isocyanate solution, or rubber compound adhesive.

The present invention is also directed to a method of forming a belt 10 with a facing fabric 24 that inhibits exposure of the rubber of the belt body 12 to a cooperating pulley. The method includes the steps of treating the facing fabric 24 with an amount of solid RFL effective to inhibit exposure of the rubber and adhering the facing fabric 24 to the belt body 12. When the belt 10 has a shaped surface to which the facing fabric 24 is adhered, the treating step involves treating with solid RFL in an amount effective to allow precise shape formation.

The following examples are given by way of illustration and not limitation:

EXAMPLE 1: TOOTHED BELT WITH FACING FABRIC HAVING 40 WT % SOLID RFL

A toothed belt was prepared using the rubber composition disclosed in TABLE 1, below. To prepare the cords, a strand was formed by collecting glass filaments about 9 μm in diameter. The strands were immersed in an RFL solution disclosed in TABLE 2, below, dried at 250° C. for two minutes and twisted at 4.0 twists/10 centimeters to produce a cord. Each cord contained about 600 filaments and had a diameter of about 0.3 millimeters (mm).

TABLE 1

| RUBBER COMPOSITION | |
|---|---|
| COMPONENT | WEIGHT PART |
| Chloroprene | 100 |
| Zinc oxide | 5 |
| Stearic acid | 1 |
| Carbon blank FEF | 50 |
| Plasticizer | 10 |
| Accelerator CM[1] | 1 |
| Accelerator IT[2] | 1 |
| Sulfur | 0.5 |

[1]N-cyclohexyl-2-benzothiazyl sulfonamide, manufactured by Sanshin Kagaku Co., Ltd.
[2]Tetrametylthiuram disulfide, manufactured by Sanshin Kagaku Co., Ltd.

The fabric was a twill weave canvas prepared using warp yarns consisting of 140 denier 6,6-nylon fiber and weft yarns consisting of 280 denier 6,6-nylon fiber and 140 denier urethane elastomer fiber with a warp density of 180 filaments/50 cm and a weft density of 160 filaments/cm. The canvas was immersed in water while vibrating to shrink it to about half its original width. The canvas was dried and then immersed into the RFL solution described in TABLE 2, below, and squeezed through a pair of rollers at a pressure of 0.5 kgf/cm (gauge) and dried. The treated canvas was immersed a second time in the same RFL solution, squeezed at the same pressure and dried to obtain 40 wt % of attached solid RFL.

TABLE 2

| RFL SOLUTION | |
|---|---|
| RFL SOLUTION | WEIGHT PART |
| Resorcinol | 10.0 |
| Formalin 37% solids | 15.0 |
| Caustic soda | 1.0 |
| Vinyl pyrrolidone latex 40% solids | 400.0 |
| Chloroprene rubber latex 50% solids | 400.0 |
| Water | 1000.0 |
| TOTAL | 1826.0 |

The amount of the adhered solid RFL was determined by the following Equation 1:

Equation 1: [(canvas weight after treatment−canvas weight before treatment)/canvas weight before treatment]×100.

The facing fabric was conventionally finished to an endless cylindrical shape and set in a die. A pair of the glass fiber cords each having S and Z pattern were wrapped around the cylindrical facing fabric at a tension of 0.9 kg/cord while arranging S and Z cords alternatingly at a pitch of 0.5 mm. A rolled sheet of chloroprene rubber was applied over the cords and the resulting assembly was cured by a common press-curing method. Finally, the cured sleeve was cut to a specified width to obtain individual belts.

The belt had a tooth shape identified as MXL, 150 teeth, a width of 6.4 mm and a tooth pitch of 2.032 mm. The shape of the teeth of the belt was observed and determined to be good.

After molding, the canvas had a rate of adhered solid RFL on the teeth surface of 0%. The rate of attached solid RFL is determined from the surface area where the rubber is exposed in the openings, divided by the total surface area.

The prepared belt was mounted on a bi-axial drive tester having a drive pulley (with 18 teeth) and a driven pulley (having 90 teeth). The belt was driven for 30 hours at a temperature of 25° C. at 9,000 rpm for the drive pulley, a 66.2 kilogram load on the driven pulley and 1.0 kg of initial belt tension. After 30 hours, the belt was visually inspected and it was determined that their was no emitted rubber powder.

TABLE 3, below, summarizes the test results.

TABLE 3

| | TEST RESULTS | | | |
| --- | --- | --- | --- | --- |
| | INVENTIVE EXAMPLE | COMPARATIVE EXAMPLE | | |
| TEST | 1 | 1 | 2 | 3 |
| Amount of solid RFL (wt %) | 40 | 55 | 25 | 20 |
| Rate of adhered solid RFL on the teeth surface (%) | 0 | 0 | about 10 | about 20 |
| Rubber powder emitted from the belt teeth after belt running | none | none | present | present |
| Shape of belt teeth | good | not correct | good | good |

COMPARATIVE EXAMPLE 1: TOOTHED BELT WITH FACING FABRIC HAVING 55 WT % SOLID RFL

A comparative toothed belt was prepared as described above in EXAMPLE 1 except that the facing fabric had 55 wt % adhered solid RFL.

The comparative toothed belt was observed and tested as described above in EXAMPLE 1. The test results are presented in TABLE 3, above.

COMPARATIVE EXAMPLE 2: TOOTHED BELT WITH FACING FABRIC HAVING 25 WT % SOLID RFL

A comparative toothed belt was prepared as described above in EXAMPLE 1 except that the facing fabric had 25 wt % adhered solid RFL.

The comparative toothed belt was observed and tested as described above in EXAMPLE 1. The test results are presented in TABLE 3, above.

COMPARATIVE EXAMPLE 3: TOOTHED BELT WITH FACING FABRIC HAVING 20 WT % SOLID RFL

A comparative toothed belt was prepared as described above in EXAMPLE 1 except that the facing fabric had 20 wt % adhered solid RFL.

The comparative toothed belt was observed and tested as described above in EXAMPLE 1. The test results are presented in TABLE 3, above.

Test results show that of the comparative examples, only the toothed belt whose facing fabric had 55 wt % solid RFL did not catch rubber powder or emit rubber powder after the test. However, when the facing fabric contained 55 wt % attached solid RFL, the desired tooth shape was not precisely attained. Thus, this toothed belt did not meet the test requirements even though it inhibited exposure and had good rubber powder emission properties. The comparative belts having less than 30 wt % solid RFL adhered to the facing fabric emitted rubber powder after the driving test and had rubber adhered to the teeth surface.

It is presently theorized that the above-described advantages of inhibiting exposure of the rubber is achieved by the facing fabric having at least about 30 wt % adhered solid RFL. For a shaped belt, inhibiting rubber exposure and precise shape formation are obtained by the facing fabric having about 30 to about 50 wt % adhered solid RFL. It is presently theorized that having at least 30 wt % adhered solid RFL narrows the openings in the facing fabric and makes it difficult for the openings to be widened because of contact between the warp and the weft so that the rubber of the belt body is not exposed through the openings. When the solid RFL exceeds 50 wt %, the shape of, e.g., the teeth, cannot be precisely formed. The solid RFL on the belt surface covered with the facing fabric also reduces the friction of that surface and the noise when the belt is driven.

The toothed belt having the facing fabric is particularly well suited for use in printers and other applications where inhibiting exposure of the rubber and precisely defining a tooth shape are important.

This invention has been described in terms of specific embodiments set forth in detail. It should be understood, however, that these embodiments are presented by way of illustration only, and that the invention is not necessarily limited thereto. Modifications and variations within the spirit and scope the claims that follow will be readily apparent from this disclosure, as those skilled in the art will appreciate.

We claim:

1. A rubber belt comprising:
    a belt body having inner and outer surfaces with laterally facing side surfaces extending therebetween; and
    a facing fabric covering at least one of the surfaces to form a surface for contact with a pulley, the facing fabric being treated only with a resorcinol-formalin-latex (RFL) solution to adhere thereto at least about 30 weight percent solid RFL based on the total weight of the facing fabric.

2. The belt of claim 1 wherein the amount of adhered solid RFL is in the range of about 30 to about 50 weight percent based on the total weight of the facing fabric.

3. The belt of claim 1 wherein the facing fabric comprises a canvas.

4. The belt of claim 3 wherein the amount of adhered solid RFL is in the range of about 30 to about 50 weight percent based on the total weight of the facing fabric.

5. The belt of claim 1 wherein the facing fabric has a width that is about half its original width prior to treating.

6. The belt of claim 1 wherein the belt is a shaped belt, the at least one surface is a shaped surface and the amount of adhered solid RFL is in the range of about 30 to about 50 wt %.

7. The belt of claim 1 wherein the belt is a toothed belt, the at least one surface is a toothed surface and the amount of adhered solid RFL is an amount in the range of about 30 to about 50 weight percent based on the total weight of the facing fabric.

8. A rubber toothed belt comprising:

a belt body having an inner and outer surfaces with laterally facing side surfaces extending therebetween, the inner surface having a plurality of teeth; and a facing fabric covering at least part of the teeth to form a contact surface for contact with a pulley, the facing fabric being treated only with a resorcinol-formalin-latex (RFL) solution to adhere thereto an amount of solid RFL in the range of about 30 to about 50 weight percent based on the total weight of the facing fabric.

9. The belt of claim 8 wherein the facing fabric comprises a canvas.

10. The belt of claim 9 wherein the fabric has a width that is about half its original width prior to treating.

11. A method of forming a power transmission belt having a facing fabric, the method comprising the steps of:

treating a facing fabric only with a resorcinol-formalin-latex (RFL) solution to produce the facing fabric having adhered solid RFL; and adhering the facing fabric to at least one surface of a belt body having inner and outer surfaces with laterally facing side surfaces extending therebetween to cover the at least one surface and form a surface for contact with a pulley, the facing fabric having at least about 30 weight percent of adhered solid RFL based on the total weight of the facing fabric.

12. The method of claim 11 wherein the at least one surface is a shaped surface and the treating step attaches an amount of solid RFL in an amount in the range of about 30 to about 50 weight percent based on the total weight of the facing fabric.

* * * * *